Jan. 19, 1943.   G. A. SEELEY   2,308,722
ARTICLE ASSEMBLING APPARATUS
Filed Nov. 22, 1940   3 Sheets-Sheet 3

INVENTOR
G. A. SEELEY
BY Emery Robinson
ATTORNEY

UNITED STATES PATENT OFFICE 2,308,722

ARTICLE ASSEMBLING APPARATUS

George A. Seeley, Baltimore, Md., assignor to Western Electric Company, Incorporated, New York, N. Y., a corporation of New York Application November 22, 1940, Serial No. 366,542

10 Claims. (Cl. 93—77)

This invention relates to article assembling apparatus and more particularly to an apparatus for inserting tubing in tubular shells.

It is an object of the present invention to provide a simple, automatic assembling apparatus for assembling tubular members.

In accordance with one embodiment of the invention as applied to apparatus for assembling asbestos tubes in tubular fibre shells for use in electrical fuses, the asbestos tubing is fed from a supply thereof to an assembling station, to which short lengths of tubular fibre shells are also fed. In their path to the assembling station, the tubular shells are moved step by step and at one position intermediate the supply of shells and the assembling station, one end of each shell is reamed to remove burrs from it and facilitate insertion of the asbestos tubing at the assembling station. The asbestos tubing is fed partway into the tubular shell and then the portion of the tubing extending from the shell is cut off from the supply. After the short length of tubing is cut from the supply, a further feeding movement is imparted to the tubing to force the severed portion entirely into the shell, suitable mechanism being provided for timing the feeding of the tubing, the reaming mechanism and the shell feeding mechanism. Adjacent the supply of asbestos tubing, there is provided a sizing die for actuating an electrical contact to interrupt the circuit to the motor which drives all of the apparatus if the tubing is of improper size, and adjacent the assembling station there is provided a further control mechanism which interrupts the motor circuit if the tubing tends to pile up in this position.

Figure 1:
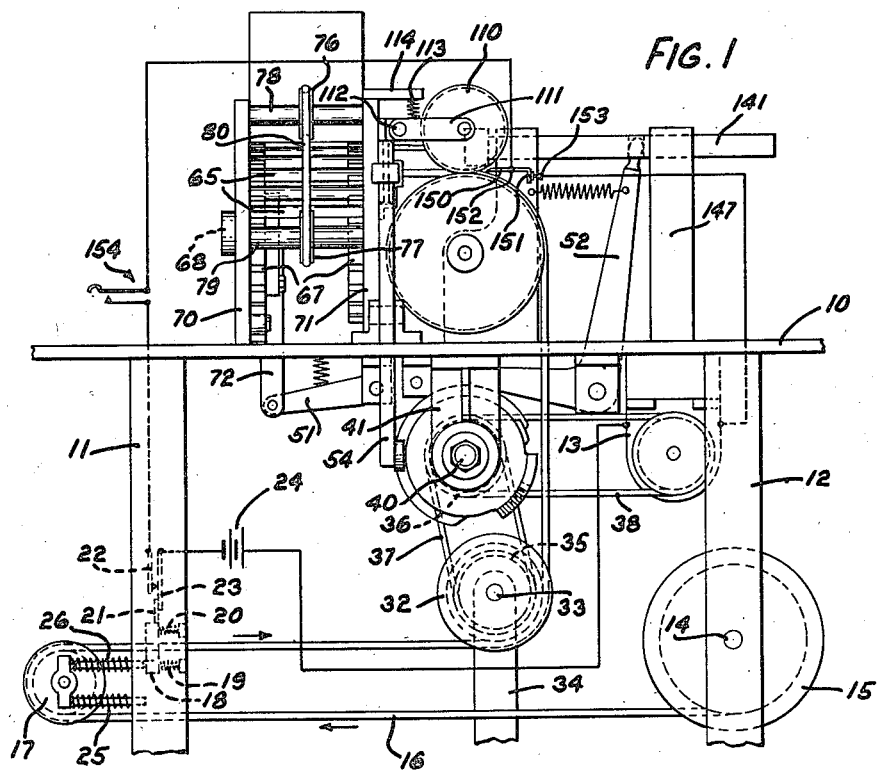
Figure 2:
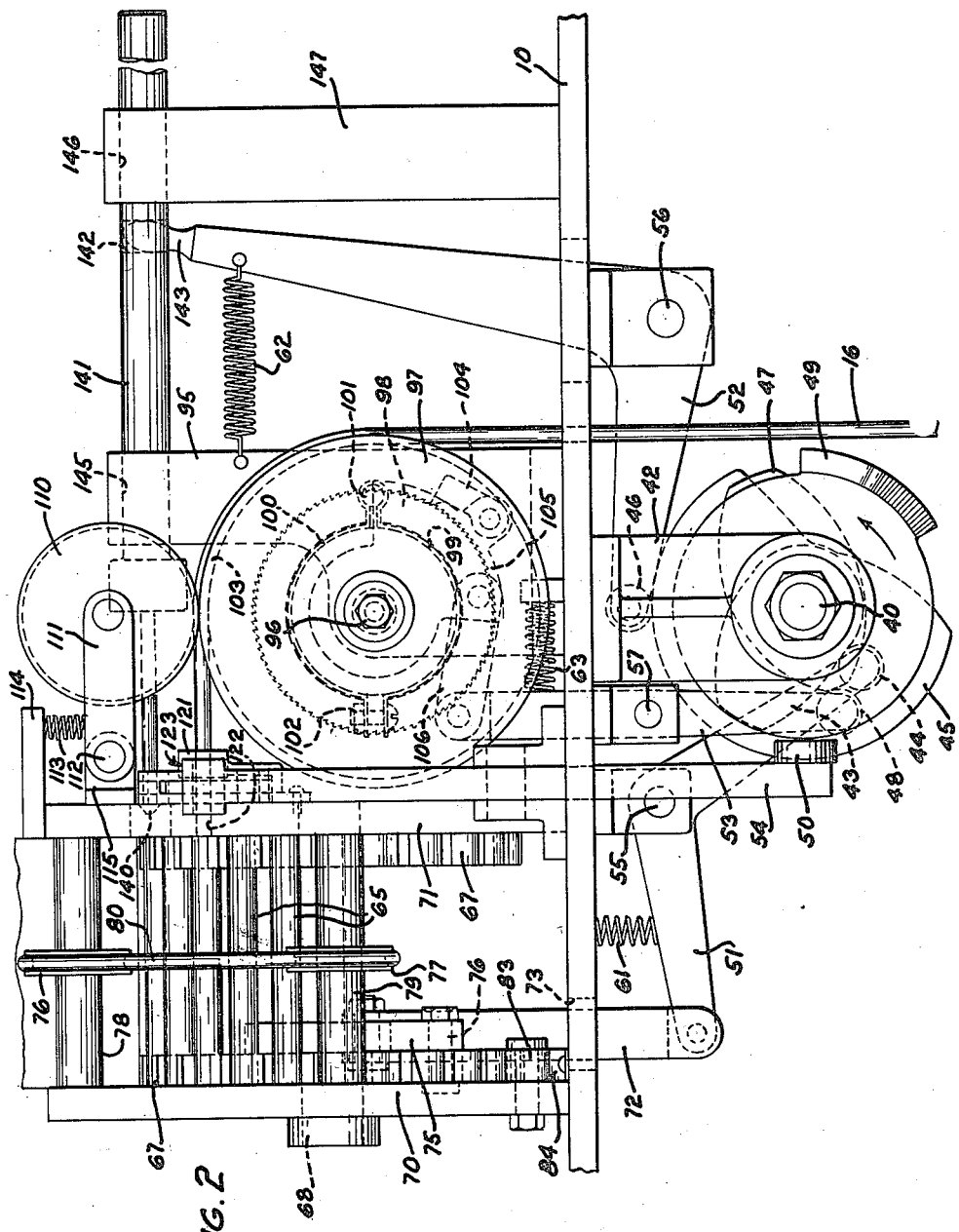
Figure 3:
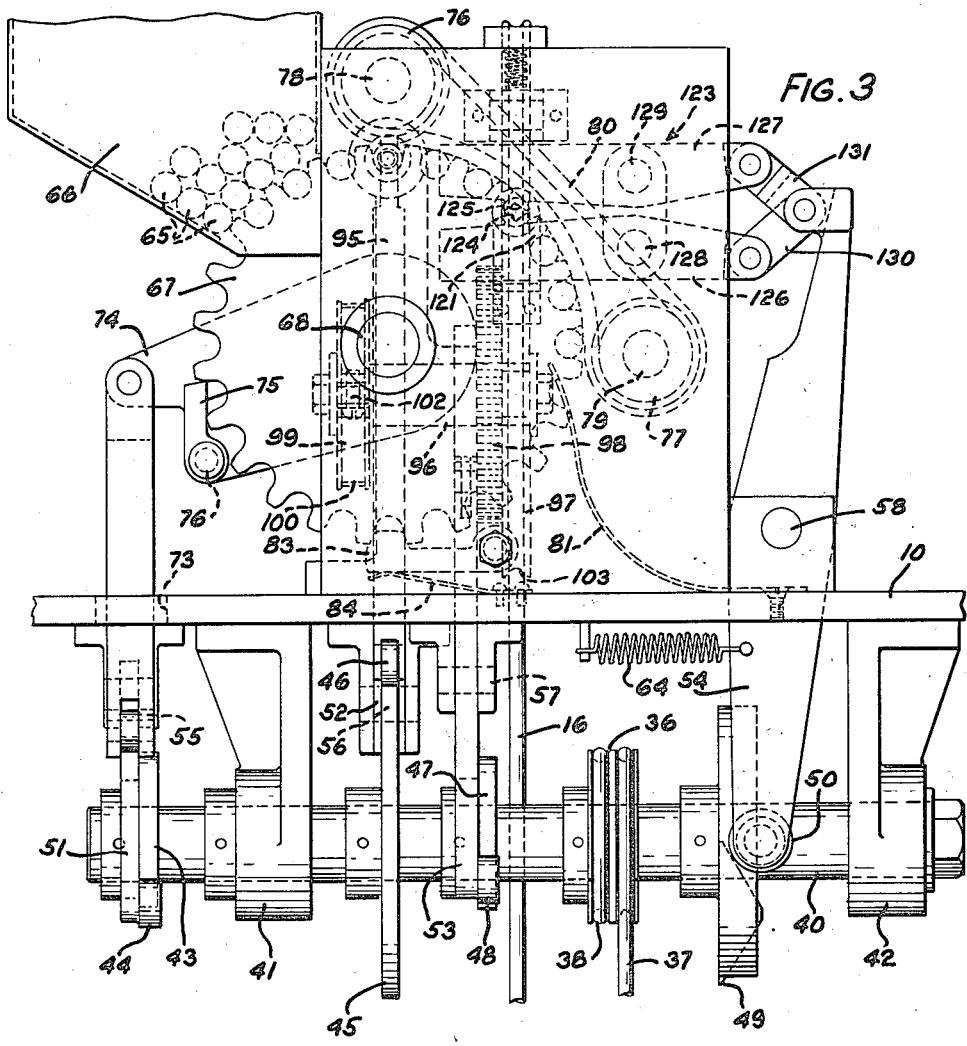

A better understanding of the invention will be had by reference to the following detail description when considered in conjunction with the accompanying drawings, wherein Fig. 1 is a front elevational view of the apparatus embodying the present invention and showing the motor controlling circuit schematically;

Fig. 2 is an enlarged front elevational view of a portion of the structure shown in Fig. 1 showing the tube feeding mechanism and control mechanisms for the various operating parts of the apparatus on a larger scale; and Fig. 3 is an end elevational view of the apparatus shown in Fig. 2.

Referring to the drawings, wherein like reference characters designate the same parts throughout the several views, particular reference being had at this time to Fig. 1, the apparatus embodying the present invention is, for the most part, supported on a table 10 provided with suitable legs or standards 11 and 12. There is suspended, from the underside of the table 10, a driving motor 13, which may be supported in any suitable manner, and which supplies the motive power for driving the various parts of the apparatus.

A reel supporting shaft 14 is fixed to the standard 12 and a corresponding standard at the rear of the table 10 and not shown in the drawings for supporting a supply reel 15 on which there is wound a supply of asbestos tubing 16. The asbestos tubing 16 is directed from the supply reel 15 to a resiliently mounted sheave 17 suitably supported on the leg or standard 11 and normally urged to the left (Fig. 1) by springs 25 and 26. The sheave 17 is provided to take up the shocks incidental to the drawing of the asbestos tubing 16 through the apparatus, as will be described hereinafter.

On the leg or standard 11, there is mounted a sizing die 18 having an aperture therethrough which is slightly larger than the outer diameter of the tubing 16. This die 18 is mounted on springs 19 and 20 so that it will be moved to the right (Fig. 1) if tubing larger than the desired size encounters the sizing die 18. Extending upwardly from the sizing die 18 is an arm 21, which, when the die 18 is moved to the right, will engage a movable contact 23 to disengage it from its associated fixed contact 22, also mounted on the leg 11, to interrupt the circuit from a source of electromotive power 24 to the motor 13. The tubing 16, after being passed over the sheave 17, is directed to a driven capstan 32, mounted upon a shaft 33, which is, in turn, freely rotatable on a standard 34. The capstan 32 has fixed to it a pulley wheel 35, which is interconnected with a chain driven pulley 36 by a chain 37 and the driven pulley 36 is, in turn, driven by a belt 38 from the motor 13. The chain driven pulley 36 is fixed to a cam shaft 40 journalled in suitable bearings 41 and 42, suitably fixed to the underside of the table 10.

The cam shaft 40 has a series of cams 43, 45, 47 and 49, suitably fixed thereto for cooperation with cam rollers 44, 46, 48 and 50, respectively. The cam rollers 44, 46, 48 and 50 are mounted on the free ends of pivoted levers 51, 52, 53, 54, which are pivoted about pins 55, 56, 57 and 58 and are urged in a direction to hold the cam rollers against their respective cams by suitably placed springs 61, 62, 63 and 64, respectively.

The cam 43, cam roller 44, and lever 51 control the feeding of tubular shells 65 from a hopper 66 to a position in the apparatus where the end of the shell is reamed and to a position in the apparatus where a section of asbestos tubing is inserted in the tubular shell. The means for feeding the shells 65 to these positions comprises a pair of toothed wheels 67, which are fixed to a shaft 68, and are rotatable together. The toothed wheels or notched discs 67 are spaced apart a distance such that their outer surfaces are spaced one from another just slightly more than the length of a tubular shell 65. The shaft 68 is journalled in a pair of plates 70 and 71, against which the outer surfaces of the toothed or notched wheels or discs 67 bear. These two plates constitute a guide for shells, which drop into the aligned notches in the toothed wheels 67, and serve to guide the shells during their movement through the apparatus. Pivotally connected to one end of the lever 51 opposite from the cam roller 44 is an actuating link 72, which extends upwardly through an aperture 73 in the table 10 and has pivotally connected to its upper end a rocker arm 74, which is freely rotatable about the shaft 68 and which carries a pawl 75. The pawl 75 is urged to rock in a clockwise direction about a pawl pin 76 fixed to the rocker arm 74 in any suitable manner and will engage the teeth or notches on the toothed wheel 67 to impart a step by step rotation to the wheels, motion being transmitted through the rotatable shaft from the driven wheel 67 to the other wheel 67. In this manner, shells 65, which are placed in the hopper 66, will fall into aligned notches in the wheel 67 and will be moved step by step through the apparatus being held between the plates 70 and 71. In order to hold the shells 65 in the notches in the wheels 67 while the shells are moving through a portion of the machine and while they are being worked upon, there is provided a pair of pulleys 76 and 77 which are freely rotatable about rods 78 and 79 fixed in the plates 70 and 71. An endless coiled spring or rubber belt 80 is stretched over the pulleys 76 and 77 to engage the shells 65 in the notches of the notched wheels 67, as most clearly shown in Fig. 3. In the operation of the apparatus, the spring or belt 80 will hold the shells 65 in the notches of the wheels 67 until all of the operations are completed, at which time the shells, in their movement with the wheels 67, will engage an ejecting member 81, which will force the shells 65, which tend to stick in the notches of the wheel 67, out of the notches. In the just described manner, the wheel 67 will be given a step by step movement and will carry the shells 65 through the apparatus and in order to hold the wheels 67 in any of their indexed positions, there is provided a spring pressed pawl 83, which is normally held in one of the notches in the left hand notched wheel 67 (Fig. 2) by a leaf spring 84. The upper end of the pawl 83, as shown in Fig. 3, is tapered slightly so that when a positive indexing movement is imparted to the wheel 67 by the pawl 75, the locking pawl 83 will be cammed out of the notch in the wheel.

Extending upwardly from the table 10 is a supporting plate 95 which has a shaft 96 journalled in it for supporting a tubing feed roller 97. The tubing feed roller 97 is fixed to the shaft 96 and carries a toothed ratchet wheel 98. Fixed to the left end of the shaft 96 is a brake drum 99, which is surrounded by a brake band 100. The brake band 100 is attached to a stud 101 mounted in the plate 95 and may be adjusted to effect the desired tension on the brake drum 99 by means of a nut and bolt assembly 102. The tubing feed roller 97 has a circumferential groove 103 formed in it to receive the tubing 16 and feed it step by step to a severing mechanism to be described. The ratchet wheel 98 may be driven step by step by means of a pawl 104, which is carried by an oscillatable pawl support 105, which is, in turn, interconnected with the lever 53 by a link 106. It should be noted at this time that the tubing feed roller 97 will have two rotative impulses transmitted to it through its pawl, cam and lever mechanism due to the configuration of the cam 47.

Mounted directly above the tubing feed roller 97 is an idler 110 mounted on an arm 111, which is normally urged about its pivot 112 by a spring 113 to hold the tubing 16 tightly against the tubing feed roller 97. The spring 113 is interposed between a plate 114 mounted on the plate 71 and the arm 111, the pivot for which is held in a bracket 115, also fixed to the plate 71. The tubing 16 is directed from the tubing feed roller 97 through a guide bushing 121, which is in direct alignment with an aperture 122 in the plate 71 so that the tubing 16 will be directed into the shells 65 held on the notched wheels 67.

Interposed between bushing 21 and the plate 71 is a shearing mechanism, designated generally by the numeral 123. The shearing mechanism 123 comprises a pair of V-shaped cutting knives 124 and 125, which are so placed on levers 126 and 127 that they, in effect, shear the tubing between them when the levers 126 and 127 have their left ends (Fig. 3) moved toward each other. The levers 126 and 127 are mounted on pivot pins 128 and 129 and are actuated through toggle levers 130 and 131, respectively, pivotally connected to them and to the upper end of the cam lever 54.

Before the shells 65 are advanced to the position where the asbestos tubing 16 is inserted in them, they are reamed at the entrance end of the shell by a reaming tool 140, which may be rotated in any suitable manner by mechanism, not shown, and the action of which is controlled by the lever 52. The reaming tool 140 is mounted upon the end of a spindle 141, which has a slot 142 formed in it to receive the upper rounded and reduced end 143 of the lever 52. The spindle 141, as may be seen in Fig. 2, is slidable in a bearing 145 formed in the upper end of the supporting plate 95 and a bearing 146 formed in the upper end of a post 147 mounted on the table 10.

At the point where the tubing 16 passes into engagement with the idler 110, there may be a tendency for the tubing 16 to pile up due to the driving action of the feed roller 97 and, accordingly, a sensitive electrical switch has been placed at this position which will interrupt the motor circuit when an undesirably large amount of tubing accumulates at this point. As shown schematically in Fig. 1, this switch comprises an arm 150, pivoted at 152, and having a contact member 151 on its right end. The contact member 151 normally engages a contact 153 to complete the circuit from the motor 13 through a manually operable control key 154, contacts 22 and 23 to the current source 24. The arm 150 is so placed that an accumulation of tubing at the idler 110 will rock the arm and interrupt the motor circuit. Any suitable switching mechanism may be provided at this position and the mechanism shown is illustrative of one which may be used.

A more complete understanding of the invention may be had by the following brief description of the operation thereof. If it be assumed that a supply of tubular shells 65, cut to the proper length, have been placed in the hopper 66 and a reel 15 of asbestos tubing 16 has been mounted on the shaft 14 and fed over the sheave 17, through the sizing die 18, over the capstan 32 between the idler 110 and tubing feed roller 97 and through the guide bushing 121, the machine is ready for operation.

Closure of the key 154 will supply current from current source 24, through contacts 22 and 23, the contacts of the key 154, contacts 151 and 153, the motor 13, and back to the current source 24. The motor 13 will drive the chain 38 and through it rotate shaft 40 and from this point on the operation of the machine will be automatic. The capstan 32 will be driven by the chain 37 and will tend to feed the tubing 16 upwardly to the feed roller 97. As the shaft 40 starts to rotate, cam 43 first becomes effective to impart oscillation to the lever 51 and in so doing, the link 72 will be moved upwardly (Figs. 2 and 3) to actuate the rocker arm 74 and through the pawl 75 step the toothed wheels 67 one step, thereby to carry a shell 65 toward the operating positions. It should be noted that it will require two steps of the operation of the pawl 75 in order to move one shell from the hopper into alignment with the reaming mechanism and that it will require three steps to feed a shell 65 from the reaming station to the position where the tubing 16 is inserted in the shell and, accordingly, the apparatus should be operated five times before the asbestos tubing is fed into the bushing 121 preliminary to starting the machine in automatic operation. As soon as the toothed wheel 67 has carried a shell to the reaming position and a reamed shell to the position where the tubing 16 is inserted in it, the cam 47 will become effective to move a section of tubing into the end of the shell 65, which is opposite the bushing 121. Shortly after the section of tubing 16 has been partially inserted in the shell 65, the cam 49 will actuate the lever 54 and through the toggle levers 130 and 131, the cutting knives 124 and 125 will be operated to simultaneously shear off the desired length of tubing and slightly pinch the tubing where it is sheared. After the shearing operation, the opposite side of the cam 47 will become effective and complete the insertion of the sheared off portion of the tubing into the shell 65 by again actuating the lever 53.

While the cam 43 is inoperative to actuate the lever 51, the cam 45 will permit the spring 62 to rock the lever 52 and thereby move the reaming tool 140 into operative engagement with the end of a shell 65 at the reaming station. In this manner, the shell 65 will first be reamed at the right end thereof (Figs. 1 and 2), a length of tubing will be inserted in the shell and sheared off from the supply 16, and new shells 65 will be carried into position to be operated upon in automatic succession. If, for any reason, the asbestos tubing 16 is damaged to such an extent that it will not enter the shells 65, the sizing die 18 will be moved to the right (Fig. 1) and thereby open the circuit to the motor 24 at the contacts 22 and 23 to stop the machine and in a similar manner, if the tubing 16 tends to bunch at feed roller 97, the motor circuit will be interrupted at contacts 151 and 153. If the tubing feeds properly, the shells, with the length of tubing inserted in them, will be carried around by the toothed wheels 67, being held in place thereon by the spring or belt 80, until they reach the position where they engage the ejector member 81, at which time they will be forced out of the notches in the notched wheels 67 and may be gathered up for further processing.

Although a specific embodiment of the invention has been described hereinbefore, it will be understood that modifications thereof may be made without departing from the scope of the appended claims.

What is claimed is:

1. An assembling apparatus for assembling lengths of flexible tubing into tubular shells comprising means for inserting a portion of tubing in a shell, means operable to sever a length of tubing from a supply of said material, and means for completing the insertion of the cut off length in the shell.

2. An apparatus for inserting relatively flexible tubing into relatively stiff tubular shells, means for feeding tubular material into machined shells, and means for simultaneously severing a length of tubular material from the supply thereof and reducing a portion of its diameter to facilitate entry thereof into a succeeding shell, said severing means comprising oppositely disposed and simultaneously movable cutting knives for applying a substantially equal pressure at the opposite sides of the tubular material to compress it equally around its periphery.

3. An apparatus for inserting relatively flexible tubing into relatively stiff tubular shells, means for feeding tubular material into shells, means for simultaneously severing a length of tubular material from the supply thereof and reducing a portion of its diameter to facilitate entry thereof into a succeeding shell, and control means for interrupting operation of the machine when oversize tubing is fed toward the severing mechanism.

4. An apparatus for inserting relatively flexible tubing into relatively stiff tubular shells, means for feeding tubular material into machined shells, means for simultaneously severing a length of tubular material from the supply thereof and reducing a portion of its diameter to facilitate entry thereof into a succeeding shell, and means for interrupting the operation of the apparatus when the means for feeding the relatively flexible material causes the flexible material to pile up adjacent the position where it is inserted in the shells.

5. In an assembling apparatus for assembling relatively flexible tubular material in relatively stiff tubular blanks, means for feeding the blanks step by step through the apparatus, and means for feeding the relatively flexible tubular material into a blank, said means comprising means for inserting part of the desired amount and later feeding the remainder of a length of flexible tubular material into the relatively stiff tubular blank.

6. In an assembling apparatus for assembling relatively flexible tubular material in relatively stiff tubular blanks, means for feeding the blanks step by step through the apparatus, means for feeding the relatively flexible tubular material into a blank, said means comprising means for inserting part of the desired amount and later feeding the remainder of a length of flexible tubular material into the relatively stiff tubular blank, and means for severing the desired length of relatively flexible tubular material from a supply thereof between the two steps of feeding the relatively flexible tubular material into the blank.

7. In an assembling apparatus, a driving motor, a circuit for supplying current to said driving motor, means driven by said motor for feeding blanks step by step through a predetermined path, means along said path for feeding lengths of relatively flexible tubular material into said blanks, means adjacent said last mentioned feeding means for severing a length of relatively flexible tubular material from a supply thereof, and means for interrupting the circuit to said motor when flexible tubular material that is too large is fed toward said blanks, said severing means comprising a pair of knives, a toggle mechanism for actuating said knives, and a lever for actuating said toggle mechanism.

8. In an apparatus for assembling asbestos tubing into relatively stiff tubular blanks comprising a driving motor, a cam shaft driven by said motor, means driven by said cam shaft for advancing asbestos tubing toward and into said blanks, means driven by said cam shaft for severing a desired length of said tubing from a supply thereof, and a control means for controlling the supply of current to said motor comprising a sizing die, a switch operated by said sizing die when oversize tubing engages the sizing die, and a circuit interrupting means adjacent the tubing feeding means for interrupting the circuit when tubing fed by the said feeding means piles up adjacent the point where it is inserted in the blanks.

9. In an assembling apparatus, means for feeding blanks through the apparatus, means for preparing an element for insertion in a blank including means for cutting an element from a length of material, means operable in two steps for inserting an element in a blank, and means for imparting movement to said inserting means in two steps, one of said steps being imparted before the cutting means is operated and the other of said steps being imparted to the inserting means after the cutting means is operated.

10. In an assembling apparatus, means for feeding blanks through the apparatus, means for preparing an element for insertion in the blank including cutting knives for severing an element from a length of material and for compressing an end of the material, said cutting knives being movable toward the center of the material to cut it from both sides and compress it equally, means for inserting the elements in a blank, and means for interrupting operation of the apparatus when the material to be cut into elements is of improper size.

GEORGE A. SEELEY.